United States Patent [19]
Garces

[11] Patent Number: 6,018,225
[45] Date of Patent: Jan. 25, 2000

[54] METHOD AND APPARATUS FOR RECONNECTING A ROTATING MOTOR TO A MOTOR DRIVE

[75] Inventor: Luis J. Garces, Mequon, Wis.

[73] Assignee: Allen-Bradley Company, LLC, Milwaukee, Wis.

[21] Appl. No.: 09/021,008

[22] Filed: Feb. 9, 1998

[51] Int. Cl.[7] .................................................. H02P 5/28
[52] U.S. Cl. .......................................... 318/798; 318/805
[58] Field of Search .................................. 318/609, 610, 318/798–811

[56] References Cited

U.S. PATENT DOCUMENTS

| | | | |
|---|---|---|---|
| Re. 33,519 | 1/1991 | Ibori et al. | 318/778 |
| 4,361,791 | 11/1982 | Plunkett | 318/723 |
| 4,680,695 | 7/1987 | Kerkman et al. | 363/160 |
| 4,689,542 | 8/1987 | Ibori et al. . | |
| 4,734,634 | 3/1988 | Kito et al. | 318/778 |
| 4,839,589 | 6/1989 | Heinle | 324/166 |
| 5,032,771 | 7/1991 | Kerkman et al. | 318/52 |
| 5,140,248 | 8/1992 | Rowan et al. | 318/811 |
| 5,298,847 | 3/1994 | Kerkman et al. | 318/800 |
| 5,347,443 | 9/1994 | Muramatsu et al. | 363/98 |
| 5,537,308 | 7/1996 | Gritter | 363/95 |
| 5,654,624 | 8/1997 | Schroderus | 322/39 |
| 5,659,231 | 8/1997 | Svarovsky et al. | 318/368 |

*Primary Examiner*—Robert E. Nappi
*Assistant Examiner*—Rina I. Duda
*Attorney, Agent, or Firm*—David G. Luettgen; John M. Miller; John J. Horn

[57] ABSTRACT

A motor is reconnected to a motor drive by exciting the motor to induce a back EMF, determining a speed of rotation of the motor based on the induced back EMF induced, and reconnecting the motor drive to the motor based on the speed determined. In order to induce the back EMF, current which flows through the motor is controlled using first and second regulators. The outputs of the first and second current regulators are separated from each other in phase by approximately 90°. A positive feedback loop is established by using the output of one of the first and second regulators to generate an input for the other one of the first and second regulators. The positive feedback loop advantageously causes the back EMF to continually increase as the motor continues to be excited, or at least not decay so rapidly that the speed of the motor cannot be accurately determined. Additionally, to determine the speed of the motor, the back EMF may be measured by commanding a current at a current command input of a current regulator, and then examining the voltage command output of the current regulator. Because the voltage command output is determined by the current regulator (e.g., in firmware or in software), there is no requirement for additional hardware to perform the voltage measurement.

24 Claims, 6 Drawing Sheets

METHOD AND APPARATUS FOR RECONNECTING A ROTATING MOTOR TO A MOTOR DRIVE

BACKGROUND OF THE INVENTION

1. Field of the Invention

This invention relates to a method and apparatus for reconnecting a motor to a motor drive. In particular, the present invention relates to a method and apparatus for reconnecting a rotating motor to a motor drive in which one or more voltage commands produced by the motor drive are used to provide an indication of the speed and direction of rotation of the motor. The present invention also relates to a method and apparatus for reconnecting a rotating motor to a motor drive in which a motor is excited using positive feedback so that a voltage induced in the motor may be measured more accurately.

2. Description of Related Art

During normal operation of a motor, the motor may become disconnected from a motor drive which drives the motor (meaning that the power supply to the motor is interrupted, not necessarily that the electrical connection between the motor drive and the motor is interrupted). There are a variety of reasons why this might occur. For example, there may be a sudden temporary power loss at the power source that supplies power to the motor and motor drive. Alternatively, it may simply be the case that there are times when it is not necessary to operate the motor, and so power is not supplied to the motor during these times.

When a motor drive becomes disconnected from a motor, it eventually becomes necessary to reconnect the motor drive to the motor. In order to perform the reconnection, it is necessary for the motor drive to "catch" the motor, that is, to determine the speed (and preferably also the direction) of rotation of the motor, before the motor drive is reconnected to the motor. The fact that the motor drive is disconnected from the motor does not prevent the motor from continuing to rotate. For example, if the motor is used in conjunction with a fan in an air conditioning system, a draft in the air conditioning system may drive the motor at an unknown speed and in an unknown direction. Similarly, if the motor is used in a conveyor system, the force of gravity acting on the motor by way of the conveyed articles and friction may drive the motor at an unknown speed and in an unknown direction.

If the speed and direction of the motor are not determined before reconnection, then the motor drive must assume an initial speed of zero when reconnecting to the motor. This often results in severe transients due to a high initial slip and due to the effects of the motor-induced back EMF on the current regulators or limiters in the motor drive. The transients are especially severe when the initial motor speed is high and when the motor is rotating in a reverse direction as compared to that commanded by the motor drive. If the current control circuitry or current limiting circuitry of the motor drive is not fast enough, the motor drive can fault due to an overcurrent condition.

In order to avoid undesirable transients and overcurrent conditions upon reconnection of the motor drive, various approaches have been developed for catching a motor. By catching the motor, the frequency and phase of the voltage supplied by the motor drive may be synchronized to the speed and direction of rotation of the motor when the motor drive is reconnected. This reduces the initial slip and therefore reduces transients upon reconnection.

According to a first approach, a mechanical sensor is utilized. The mechanical sensor, such as an encoder or resolver, is used to directly measure the speed and direction of rotation of the motor. The disadvantage of this approach is that it requires additional hardware and therefore increases the cost of the system.

According to a second approach, voltage feedback is utilized. The frequency and phase of the back EMF produced by the motor provides a direct indication of the speed and direction of rotation. One disadvantage of the voltage feedback approaches which have been provided thus far is that they require additional hardware (i.e., the hardware necessary to perform the voltage measurement).

Another disadvantage of most voltage feedback approaches provided thus far is that they do not work satisfactorily in conjunction with induction motors, especially small induction motors (less than five or ten horsepower). Unlike DC motors and synchronous motors, which always produce a back EMF voltage when driven mechanically, induction motors do not produce a back EMF unless special measures are taken to excite a field in the induction motor. Although a back EMF can be induced in an induction motor, for example, by applying current pulses to the motor as the motor rotates, this does not work well if the motor is large (because it is very difficult to excite the motor in a short amount of time) or small (because the induced voltage to decays too rapidly to be accurately measured). Alternatively, the remanence voltage of the induction motor can also be utilized for voltage feedback. However, this alternative is only usable in conjunction with large induction motors, because the amplitude of the remanence voltage produced by small induction motors is not sufficient to permit the speed to be accurately determined.

Induction motors, and especially small induction motors, therefore present a unique problem. Unlike all other types of motors, induction motors do not automatically produce a back EMF voltage. Therefore, the preferred approach for determining the speed of an induction motor is usually mechanical feedback. However, small induction motors tend to be more cost-sensitive and the increase in cost associated with the use of mechanical feedback is often unacceptable.

According to a third approach, frequency sweeping is utilized. Frequency sweeping is used primarily in conjunction with induction motors. According to this approach, the motor is excited with a small current having a frequency which is swept downward from a maximum frequency. If the excitation frequency is higher than the speed of the motor, then the motor acts as a motor; otherwise, the motor acts as a generator. The speed of the motor can therefore be detected by detecting the reversal in power which occurs when the excitation frequency crosses the speed of the motor.

The disadvantage of this approach is that the frequency sweeping can take several seconds to complete. In many applications, it is desirable to reconnect to the motor drive as quickly as possible, such as in the range of 300–500 milliseconds. For example, when there is a temporary power loss to a motor which drives a conveyor belt, it is desirable for operation to continue as smoothly as possible without jostling the articles on the conveyor belt. Hence, in many applications, the several seconds required to perform the reconnection is unacceptable.

In short, although various approaches have been developed for determining the speed and direction of rotation of a motor before reconnection, these approaches all suffer from one or more of the above-mentioned drawbacks. It would be highly advantageous if an approach could be provided which does not suffer these drawbacks. Namely, what is needed is an approach which does not require additional hardware, which is able to reconnect a motor in a short amount of time, and which is usable in conjunction with all types of motors, and especially in conjunction with induction motors.

SUMMARY OF THE INVENTION

In order to overcome these drawbacks of the prior art, the present invention provides a method and apparatus for reconnecting a motor which does not require additional hardware, which is able to reconnect a motor in a short amount of time, and which is usable in conjunction with all types of motors, and especially in conjunction with induction motors.

According to one aspect of the invention, a motor is reconnected to a motor drive by exciting the induction motor to induce a back EMF, determining a speed of rotation of the motor based on the induced back EMF induced, and reconnecting the motor drive to the motor based on the speed determined. In order to induce the back EMF, current which flows through the induction motor is controlled using first and second regulators. The outputs of the first and second regulators are separated from each other in phase by approximately 90°. A positive feedback loop is established by using the output of one of the first and second regulators to generate an input for the other of the first and second regulators. The positive feedback loop advantageously causes the back EMF to continually increase as the motor continues to be excited, or at least not decay so rapidly that the speed of the motor cannot be accurately determined. Moreover, because the invention does not use frequency sweeping, the invention is able to reconnect the motor in a short amount of time.

According to another aspect of the invention, in order to determine the speed of the motor, the back EMF is measured by commanding a current (such as zero current) at a current command input of a current regulator, and then examining the voltage command output of the current regulator. Because the voltage command output is determined by the current regulator (e.g., in firmware or in software), there is no requirement for additional hardware to perform the voltage measurement. An analogous process may also be used to determine the direction of rotation of the motor.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
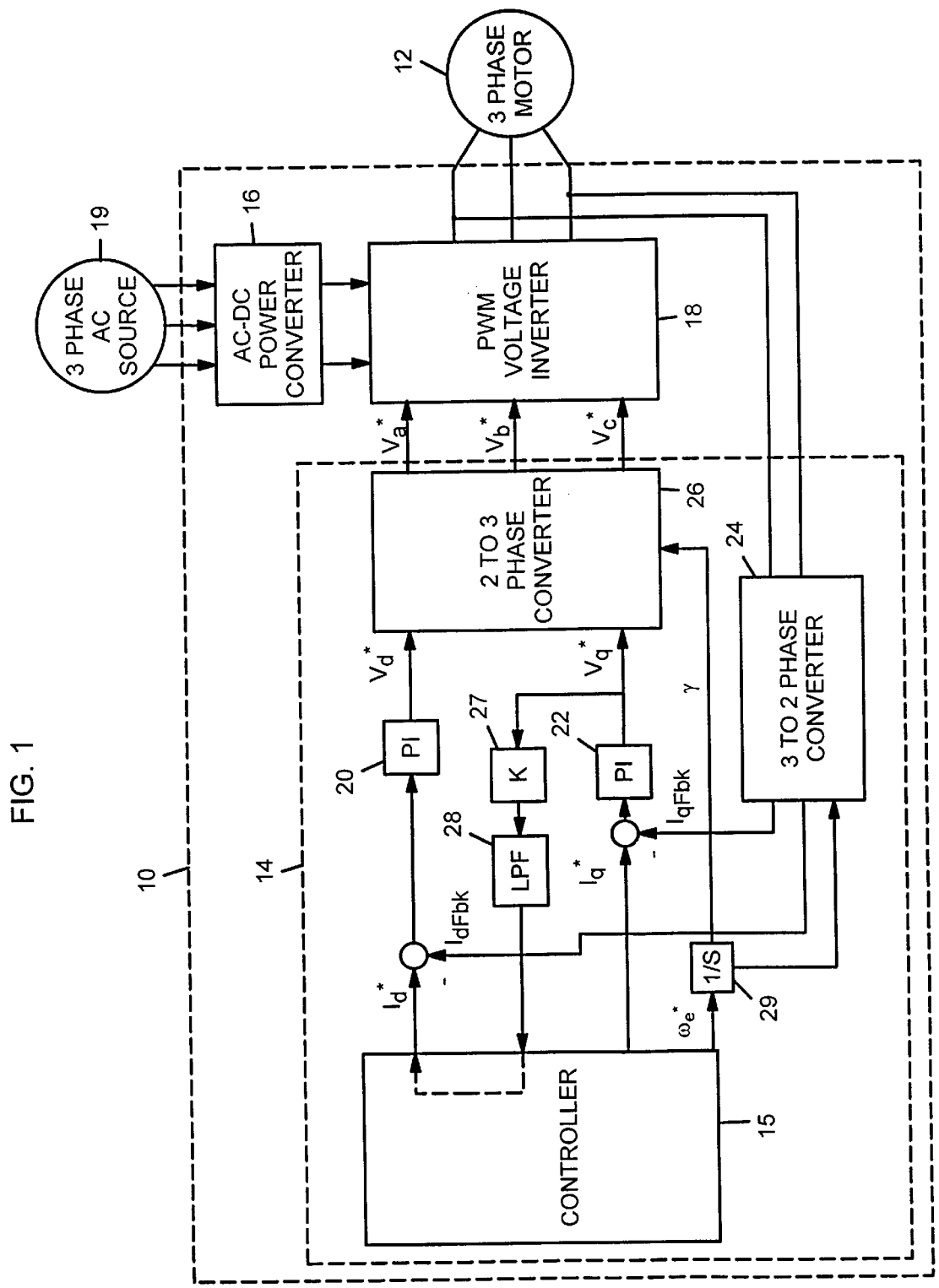
FIG. 1 is a block diagram of a motor drive which catches a rotating motor in accordance with an embodiment of the present invention.

Referring now to FIG. 1, a block diagram of a motor drive 10 which catches an electric motor 12 is illustrated. The motor 12 in the illustrated embodiment is an induction motor, for example, a ten horsepower or less induction motor. As detailed below, however, the invention can also be used in conjunction with other types of motors.

The motor drive 10 includes a microprocessor-based control system 14, an AC to DC power converter 16, and a PWM (Pulse Width Modulation) voltage inverter 18. The control system 14, the power converter 16 and the voltage inverter 18 cooperate so as to drive the motor 12 using power supplied by a three phase AC power source 19.

The control system 14 regulates the current through the motor 12 by generating voltage commands $V_a^*$, $V_b^*$ and $V_c^*$ based on current commands $I_d^*$ and $I_q^*$. (Herein, the superscripted asterisk denotes a "command" signal.) Of course, since current and voltage are directly related, the fact that current is controlled means that voltage is simultaneously also controlled, and vice versa. The control system 14 uses a field-oriented control scheme to control the speed and torque of the motor 12. As such, the stator current is resolved into a torque-producing or q-axis component of current, $I_q$, and a field-producing or d-axis component of current, $I_d$. The q-axis leads or lags the d-axis by 90° in phase difference. As detailed below, converters are used to transform current and voltage parameters back and forth between the two-phase d-q frame of reference frame and the three-phase rotor frame of reference.

The control system 14 includes a controller 15 which generates the current commands $I_d^*$ and $I_q^*$, as well as a frequency command $\omega_e^*$. During normal connected operation, the controller 15 generates the commands $I_d^*$, $I_q^*$ and $\omega_e^*$ based on a speed command received at a user input (not illustrated). While the motor drive 10 is catching the motor 12, the controller 15 generates the commands $I_d^*$, $I_q^*$ and $\omega_e^*$ in a manner which is described in greater detail below in conjunction with FIG. 2.

The control system 14 includes two current regulators 20 and 22 which are respectively formed of PI (proportional-integral) feedback control loops and which regulate the flow of current through the motor 12 based on the current commands $I_d^*$ and $I_q^*$. Feedback signals $I_d$Fbk and $I_q$Fbk for the current regulators 20 and 22, respectively, are provided by a 3-to-2 phase transform block 24. The transform block 24 converts the three-phase variables $I_a$Fbk and $I_c$Fbk to the two-phase synchronous d-q reference frame.

The outputs of the current regulators 20 and 22 are the voltage commands $V_d^*$ and $V_q^*$. The voltage commands $V_d^*$ and $V_q^*$ are received at a 2-to-3 phase transform block 26. The transform block 26 converts the two-phase voltage commands $V_d^*$ and $V_q^*$ into the three-phase voltage commands $V_a^*$, $V_b^*$ and $V_c^*$. The transform block 26 (as well as the transform block 24) receives a rotation angle γ, which is a parameter of the 3-to-2 and 2-to-3 phase transforms, from an integrator 29. During normal connected operation, the rotation angle γ is computed based on the frequency command $\omega_e^*$ which is input to the integrator 29. During the reconnection process, the frequency command $\omega_e^*$ and the rotation angle γ are both set equal to zero.

The voltage commands $V_a^*$, $V_b^*$ and $V_c^*$ are received by the PWM voltage inverter 18, which generates PWM control signals based on the voltage commands $V_a^*$, $V_b^*$ and $V_c^*$. The PWM voltage inverter 18 includes a network of six solid state switches (not illustrated) which are switched on and off in accordance with the PWM control signals. The solid state switches convert the low power PWM control signals to high power current pulses to drive the motor 12 using power supplied by the three-phase AC source 19 via the AC-DC power converter 16. The PWM voltage inverter 18 also includes a conventional PWM dead time compensation circuit (not illustrated) to compensate for the dead time necessary between PWM pulses to prevent short circuiting the power supply.

Finally, the control system 14 also includes a constant multiplier 27 and a filter 28. The multiplier 27 and filter 28 increase the magnitude and reduce ripple voltage, respectively, in the voltage command $V_d^*$. The constant multiplier 27 and filter 28 establish a positive feedback loop which, as described in greater detail in conjunction with FIG. 2, increases or at least maintains the excitation in the motor 12 while the motor drive 10 is being reconnected.

Figure 2:
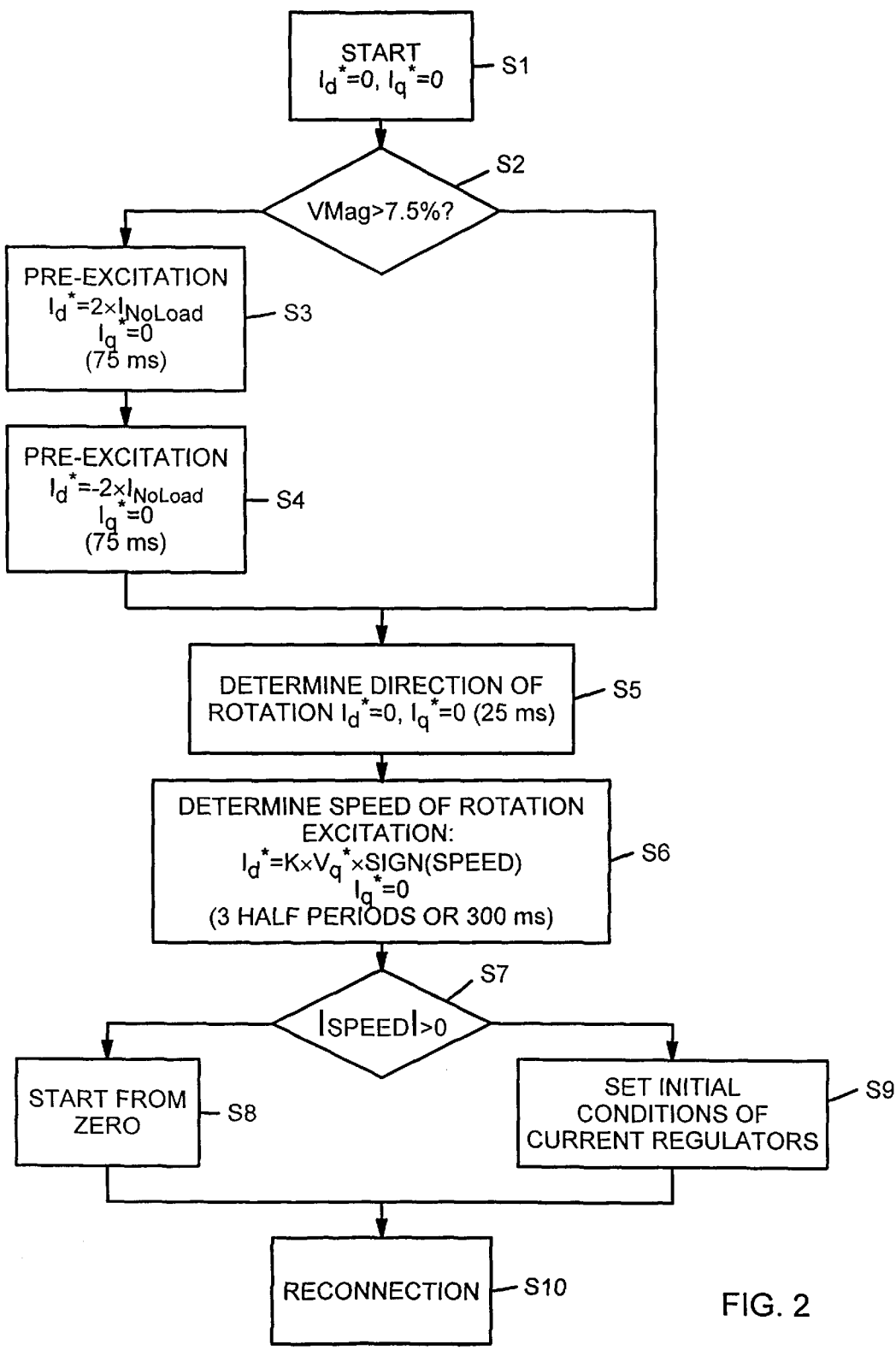
FIG. 2 is a flowchart describing the operation of the motor drive illustrated in FIG. 1 to catch a rotating motor.

Referring now to FIG. 2, a flowchart describing the operation of the motor drive 10 to catch the motor 12 is illustrated. Initially, it is assumed that the motor drive 10 has been disconnected from the motor 12 meaning, for example, that the transistors in the inverter 18 continually remain in an "off" state. The speed and direction of rotation of the motor 12, as well as the amount of time that the motor drive 10 has been disconnected, are assumed to be unknown.

At step S1, an initial determination is made as to whether the motor 12 is producing back EMF. This determination is made because, depending on whether a back EMF already exists, it may or may not be necessary to induce a back EMF by performing pre-excitation steps S3 and S4. Advantageously, the determination is made in a manner which does not require additional hardware to perform a voltage measurement. Namely, the current regulators 20 and 22 are initialized by setting the current commands $I_d^*$ and $I_q^*$ equal to zero, and the resultant voltage commands $V_d^*$ and $V_q^*$ are analyzed to determine whether a back EMF exists.

Specifically, setting the current commands $I_d^*$ and $I_q^*$ equal to zero permits the existence of a back EMF to be determined in the following manner. When the current commands $I_d^*$ and $I_q^*$ are set equal to zero, the control system 14 determines the voltage commands $V_d^*$ and $V_q^*$, and therefore the voltage commands $V_a^*$, $V_b^*$ and $V_c^*$, such that no current flows through the motor 12. In order for zero current to flow through the motor 12, the voltage commands $V_a^*$, $V_b^*$ and $V_c^*$ must be an exact image of the actual motor voltages $V_a$, $V_b$ and $V_c$. If the voltage commands $V_a^*$, $V_b^*$ and $V_c^*$ were not an exact image of the actual motor voltages, then the voltage difference would create a current flow. However, such a current flow is (at least substantially) prevented by the current regulators 20 and 22, since the current commands $I_d^*$ and $I_q^*$ are set equal to zero. Therefore, since the voltage commands $V_a^*$, $V_b^*$ and $V_c^*$, are an image of the actual motor voltages and are determined in the firmware/software executed by the control system 14, a determination may be made whether a back EMF exists without performing a separate voltage measurement.

In addition to current commands $I_d^*$ and $I_q^*$ which command a current of zero, other current commands could be used. No current, or at least a DC current, is especially well-suited for use because the frequency component of the resulting voltage command $V_d^*$ or $V_q^*$ is entirely attributable to the speed of the motor. However, any current command which allows the speed of the motor to be determined based on the resulting voltage commands may be used.

At step S2, it is determined whether the magnitude of the voltage commands is larger than a predetermined threshold. This computation may be performed by computing the square root of the sum of the squares of the voltage commands $V_d^*$ and $$V_q^*, \text{ i.e., } \sqrt{(V_d^*)^2 + (V_q^*)^2},$$

and determining whether this value is larger than 7.5% of the rated voltage of the motor 12. Alternatively, the voltage commands $V_a^*$, $V_b^*$ and $V_c^*$ could also be used.

If the condition in step S2 is not met, then at steps S3 and S4, current pulses are applied to the motor 12 in order to attempt to induce a back EMF. In practice, it has been found that applying one positive pulse and one negative pulse to the motor 12 is most effective at inducing a back EMF. Therefore, at step S3, the current command $I_d^*$ is set equal to a predetermined level (e.g., two times the no load current for the induction motor) for short period of time (e.g., 75 ms). In step S4, the current command $I_d^*$ is pulsed in the opposite direction (e.g., negative two times the no load current) for an additional short period of time (e.g., an additional 75 ms).

Of course, if the motor 12 is not rotating, then the pulses applied in steps S3 and S4 do not induce a back EMF. As detailed below, the control system 14 eventually assumes that the lack of an induced back EMF means that the motor is not rotating and, in this case, the motor drive 10 is reconnected using zero speed initial conditions. In the interim, however, the control system 14 attempts to perform the intermediate steps since it is not known for certain whether or not the motor 12 is rotating.

If the condition in step S2 is met, then a back EMF already exists in the motor 12. Since the field in an induction motor generally decays within a few seconds after power is removed (and less for a small induction motor), this condition being met implies that the motor drive 10 has been disconnected for only a short period of time. In this event, it is not necessary to induce a back EMF, and steps S3 and S4 may be skipped altogether.

It may be recalled that steps S3 and S4 each take seventy-five milliseconds to perform, and that the total amount of time required to catch the rotating motor should be in the range of about 300–500 milliseconds. Therefore, skipping steps S3 and S4 reduction is especially critical where the motor 12 has been disconnected for only a short period of time (as is the case when step S2 is met), because it facilitates returning the motor to full speed so quickly that the disconnection is not perceptible.

At step S5, the direction of rotation of the motor 12 is determined. In order to determine the direction of rotation, the back EMF is again measured using the technique described in conjunction with step S1, namely, setting $I_d^*$ and $I_q^*$ equal to zero. The following relations are then utilized:

$$V_d = |V| * \sin(\omega_e t) \tag{1a}$$

$$V_q = |V| * \cos(\omega_e t) \quad (1b)$$

where $V_d$ and $V_q$ are the actual motor voltages (in the stationary reference frame), V is the magnitude of the motor voltages $V_d$ and $V_q$, and $\omega_e$ is the speed of the rotating magnetic field in the motor 12. By taking the derivative of Eq. (1a), and multiplying the derivative of Eq. (1a) by Eq. (1b), the following relation is obtained:

$$\frac{dV_d}{dt} * V_q = \omega_e * |V|^2 \cos^2(\omega_e t) \quad (2)$$

It may be noted that the $|V|^2$ and $\cos^2(\omega_e t)$ terms are always positive; therefore, the $$\frac{dV_d}{dt} * V_q$$

term is negative if and only if the $\omega_e$ term is negative. Therefore, by measuring the voltages $V_d$ and $V_q$ (using the voltage commands $V_d^*$ and $V_q^*$) and computing $$\frac{dV_d}{dt} * V_q,$$

the direction of rotation of the motor may be determined.

As previously indicated, the voltages $V_d$ and $V_q$ are measured by examining the $V_d^*$ and $V_q^*$ outputs of the current regulators 20 and 22. Being proportional-integral control loops, the current regulators 20 and 22 each have a "voltage command" output and an "integrator" voltage command output which are added together to form the total voltage command output $V_d^*$ or $V_q^*$. In practice, it has been found that the direction computation embodied by Eq. (2) may be improved by using only the integrator outputs of the current regulators 20 and 22 to represent the voltage commands $V_d^*$ and $V_q^*$, respectively. The voltages $V_d$ and $V_q$ tend to be very noisy and this noise can, for example, cause the $$\frac{dV_d}{dt} * V_q$$

term to be negative even though the actual direction of rotation is positive. Since an integrator acts as a filter, the use of the integrator outputs prevents this noise from causing an erroneous determination of the direction of rotation of the motor.

At step S6, the speed of rotation is determined. In order to more accurately determine the speed of rotation, positive feedback is used to increase the magnetic field and therefore the back EMF induced in the motor 12. The positive feedback increases the magnitude of the field induced in the motor, or at least prevents the field from decaying so quickly that it is impossible to measure the back EMF.

Specifically, the positive feedback is created by using the voltage command of one axis ($V_q^*$) to generate the current command for the other axis ($I_q^*$). Positive feedback is created because the voltage command $V_q^*$ is 90° out of phase with the voltage command $V_d^*$, and because the voltage command $V_q^*$ has the same frequency as the frequency of rotation. As a result, since the voltage command $V_q^*$ is used to generate the current command $I_d^*$, the current command $I_d^*$ shares the same properties as the voltage command $V_q^*$. Namely, the current command $I_d^*$ and voltage command $V_d^*$ are 90° out of phase, and the current command $I_d^*$ has the same frequency as the frequency of rotation. Therefore, substantially all of the energy delivered to the motor 12 by the current $I_d^*$ is transferred to the magnetic field instead of being dissipated as heat. Moreover, the back EMF and the current command $I_d^*$ feed each other and both increase as the motor continues to be excited.

To clarify understanding, it is helpful to consider the result if the current $I_d$ has the same frequency but is not 90° out of phase with the voltage $V_d$. In this case, the energy supplied by the current $I_d$ is not transferred entirely to the magnetic field of the motor. Rather, at least some of the energy is dissipated as heat. This is because the motor 12 is partially an inductor and partially a resistor. Since the current $I_d$ is not 90° out of phase with the voltage $V_d$, part of the voltage drop produced by the current $I_d$ occurs over the resistive portion of the motor 12 and is dissipated as heat. It may also be noted that, if the current $I_d$ is between 180° and 360° out of phase with the voltage $V_d$, then not only is at least some of the energy dissipated as heat, but the remaining energy which is not dissipated as heat actually de-excites the field in the motor 12. (For this reason, it is important to correctly determine the direction of rotation in step S5.) If the current $I_d$ has a different frequency than the speed of rotation of the motor, then there is a combination of the above effects, i.e., some of the energy supplied by the current $I_d$ excites the field in the motor, but some of the energy supplied by the current de-excites the field in the motor and the remaining energy is dissipated as heat.

In order to determine the frequency and phase of the back EMF induced in the motor 12, a predetermined number of zero crossings of one of the phases of the back EMF may be detected, and the timing of the zero crossing may be used in conventional fashion to determine frequency and phase. In the embodiment illustrated in FIG. 2, three zero crossings are detected.

At step S7, it is determined whether the motor 12 has stopped rotating. If a predetermined amount of time has elapsed (300 ms in the illustrated embodiment) and the predetermined number of zero crossings have not yet been detected, then it is assumed that the motor has stopped rotating. As a result, at step S8, initial conditions are set in the motor drive 10 which correspond to the motor being stopped. At step S10, after the initial conditions are set, the motor drive 10 is reconnected.

If the motor has not stopped rotating at step S8, then at step S9 initial conditions are set in the motor drive 10 which correspond to the measured speed of the motor. The initial conditions may include, for example, the magnitude, frequency and phase of the voltage commands $V_d^*$ and $V_q^*$. Then, at step S10, the motor drive 10 is reconnected.

If the motor 12 is not an induction but instead is another type of motor, such as a DC motor or a synchronous motor, then an abbreviated version of the process illustrated in FIG. 2 may be utilized. As previously described, DC motors and synchronous motors generate a back EMF automatically, without there being a need to induce a back EMF by the application of a current to generate a field. Therefore, it is not necessary to excite the motor as described in conjunction with steps S3–S6. However, the back EMF of a DC or synchronous motor may still be detected by setting the current commands to zero in the manner described in conjunction with step S1. In this manner, an image of the back EMF may be obtained without using additional hardware to perform a voltage measurement. Then, the speed of rotation may be determined in step S6, the initial conditions of the motor drive 10 set in steps S7–S9, and the motor drive reconnected at step S10.

Figure 3:
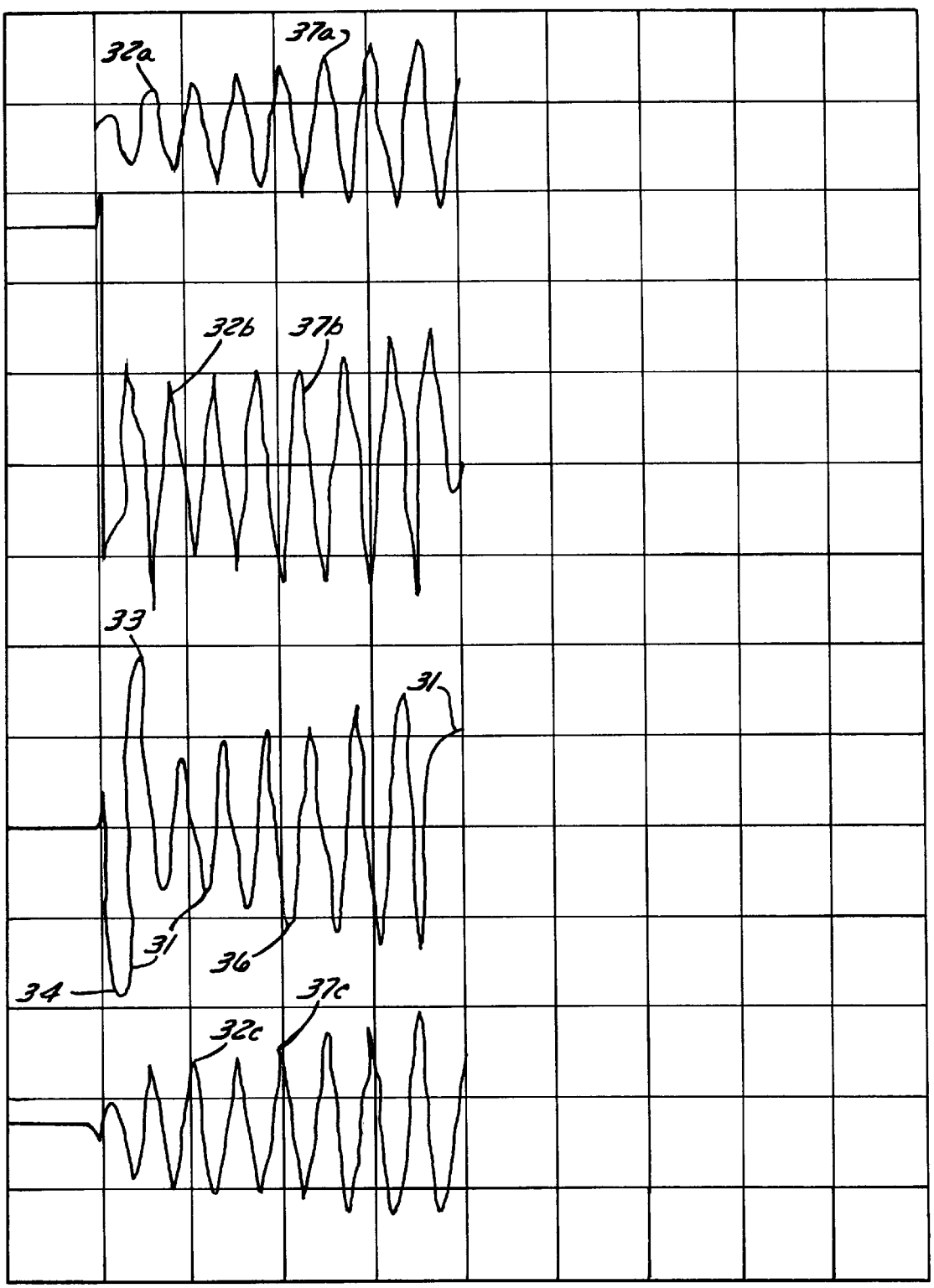
FIG. 3 is an oscillogram which illustrates pre-excitation and excitation of a rotating motor during the process illustrated in FIG. 2.

Referring now also to FIGS. 3–6, various oscillograms which show the operation of the motor drive 10 under in different operating conditions are illustrated. Referring first to FIG. 3, an oscillogram showing pre-excitation and excitation of a rotating motor is illustrated. The oscillogram includes traces 31, 32a, 32b and 32c. Trace 31 represents the current in one of the phases of the motor 12. The remaining traces 32a, 32b and 32c are the voltage commands $V_a^*$, $V_b^*$ and $V_c^*$, respectively.

The trace 31 has a positive pulse 33 and a negative pulse 34 which correspond to the pulses applied in steps S3 and S4, respectively. After the initial pulses 33 and 34 are applied, and the direction of rotation is determined, the positive feedback loop is established. The current which is supplied to the motor causes the back EMF to increase, which in turn causes the magnitude of the voltage command $V_q^*$ to increase, which in turn causes more current to be supplied to the motor, the additional current supplied to the motor causes a further increase in the back EMF, and so on. The positive feedback is represented by a region 36 for the current trace 31, and by regions 37a, 37b and 37c for the voltage traces 32a, 32b and 32c.

One additional benefit of the positive feedback is that it increases the magnetic field in the motor 12 prior to reconnection. Since the motor 12 must be re-energized before the motor 12 can return to full speed, the fact that the magnetic field is increased reduces the amount of time required to return the motor 12 to full speed.

Figure 4:
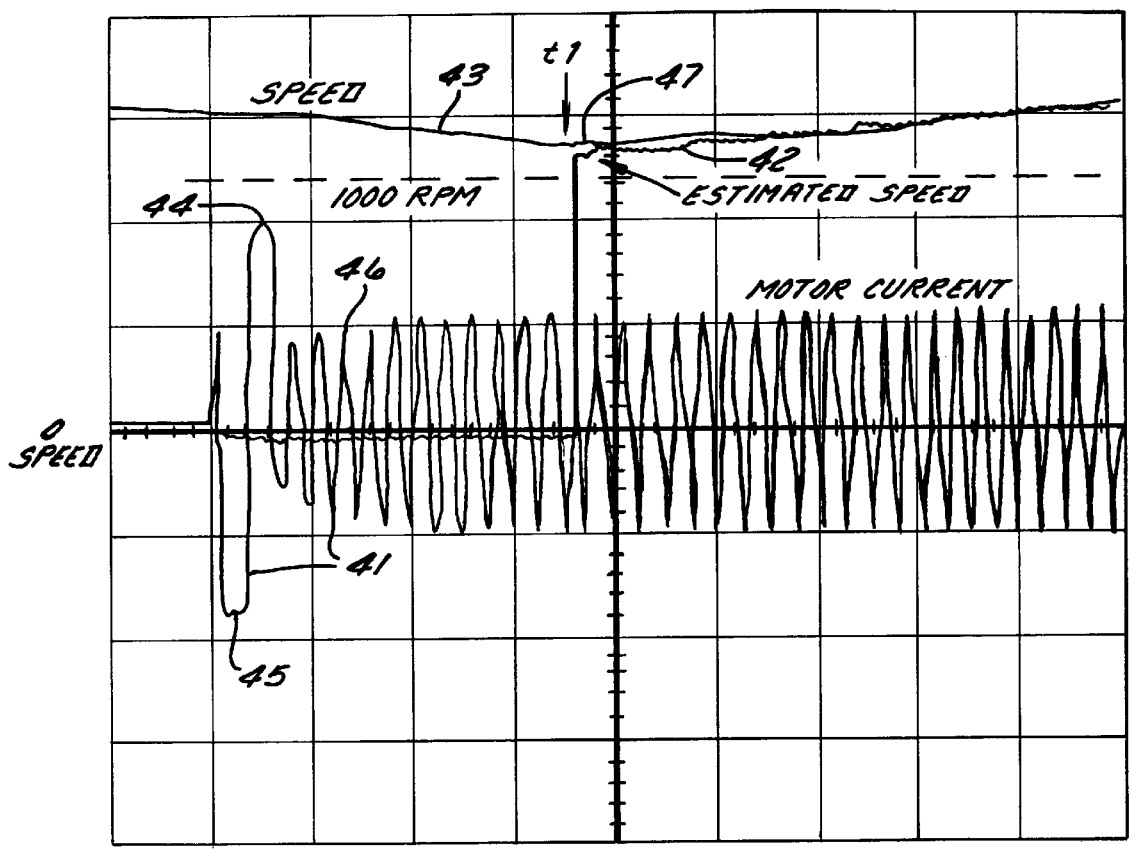
FIG. 4 is an oscillogram which illustrates the motor drive of FIG. 1 catching a rotating motor.

Referring now to FIG. 4, an oscillogram showing the motor drive 10 catching a rotating motor is illustrated. The oscillogram includes traces 41, 42 and 43 which respectively correspond to the current in one of the phases of the motor 12, the speed of the motor as estimated by the motor drive 10, and the actual speed of the motor (measured using a tachometer).

Again, the trace 41 has a positive pulse 44 and a negative pulse 45 which correspond to the pulses applied during steps S3 and S4, respectively. After the initial pulses 44 and 45 are applied, and the direction of rotation is determined, the positive feedback loop is established and the current trace 41 experiences a positive feedback region 46 in which the current increases. It may be noted that, in contrast to the embodiment of FIG. 2, the control system 14 waits more than three half periods before computing the speed of the motor. The number of half periods used may of course be varied to achieve optimal results.

As indicated by trace 43, the speed of the motor 12 steadily decreases when the motor drive 10 is disconnected until an inflection point 47 is reached. The inflection point 47 corresponds to the instant at which step S10 is completed and the motor drive 10 is reconnected to the motor 12. Thereafter, the motor drive 10 begins to drive the motor 12, causing a phase reversal in the current trace 41, and the speed of the motor begins to increase.

Figure 5:
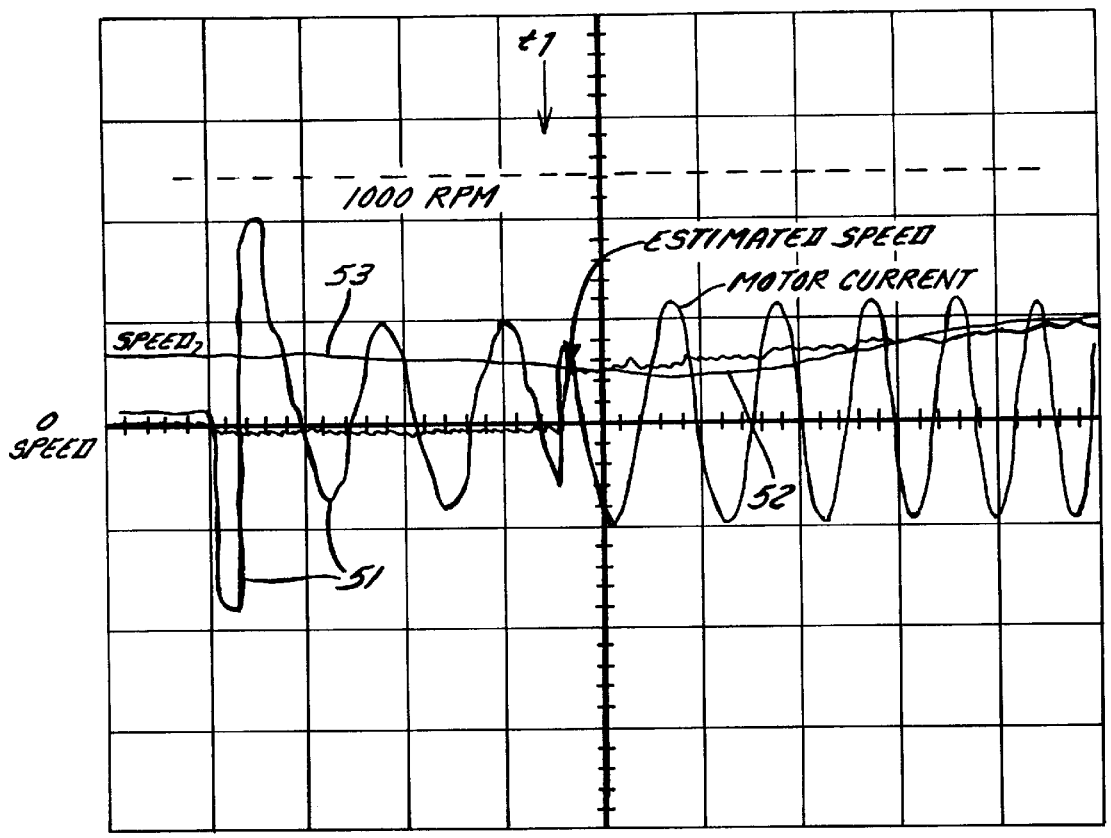
FIG. 5 is an oscillogram which illustrates the motor drive of FIG. 1 catching a motor that is rotating at a relatively low speed.

Referring now to FIG. 5, an oscillogram showing the motor drive 10 catching a rotating motor is illustrated. The oscillogram includes traces 51, 52 and 53 which are defined in the same manner as the traces 41, 42 and 43, respectively, in FIG. 4.

The primary difference between FIG. 5 and FIG. 4 is that the motor 12 is rotating at a slower speed in FIG. 5 as compared to FIG. 4. Whereas the speed of the motor 12 is above 1000 RPM in FIG. 4, the speed of the motor is well below 1000 RPM in FIG. 5. For this reason, the motor current trace 51 in FIG. 5 has a frequency which is smaller than the frequency of the motor current trace 41 in FIG. 4.

Because of the motor 12 is rotating at a slower speed in FIG. 5, the positive feedback effects are not as dramatic as compared to FIG. 4. At the lower frequency, the resistive portion of the motor 12 dominates over the inductive portion, and the current regulator 20 is unable to maintain the 90° phase separation between the current command $I_d^*$ and the voltage command $V_d^*$. Nevertheless, although the back EMF does not increase, it also does not decay as it would without the positive feedback. Advantageously, therefore, the positive feedback prevents the back EMF from decaying so rapidly that it is impossible to accurately measure.

Figure 6:
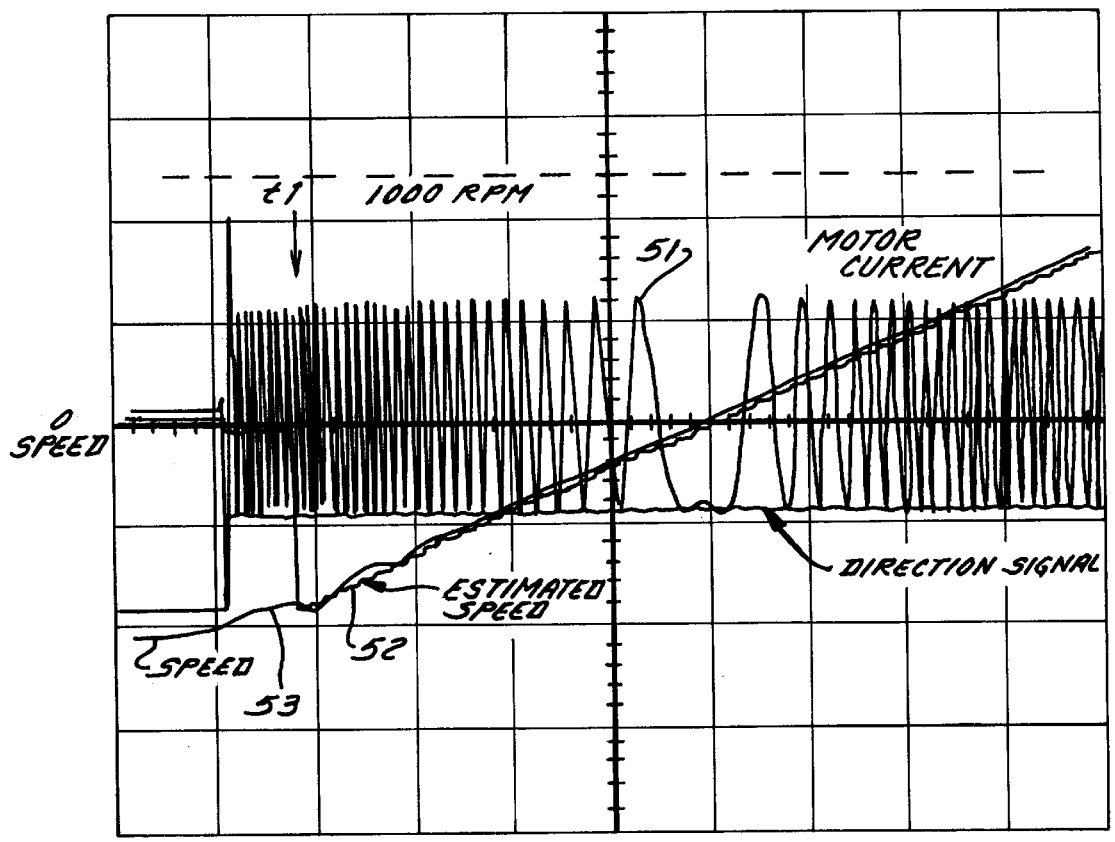
FIG. 6 is an oscillogram which illustrates the motor drive of FIG. 1 catching a motor that is rotating in a direction opposite a commanded direction.

Referring now to FIG. 6, an oscillogram showing the motor drive 10 catching a rotating motor is illustrated. The oscillogram includes traces 61, 62 and 63 which are defined the same as the traces 41, 42 and 43, respectively, in FIG. 4.

The primary difference between FIG. 6 and FIG. 4 is that, in FIG. 6, the motor 12 is initially rotating in a direction which is opposite a commanded direction, and the speed trace 63 is initially negative. The operation of the motor drive 10 to reconnect is the same under this condition. Specifically, current pulses are applied, the speed and direction of rotation of the motor are determined, and the motor drive 10 is reconnected to the motor 12 at an instant T1.

The motor drive 10 then brings the motor 12 to the commanded speed. After the motor drive 10 is reconnected, the motor drive 10 initially slows down the motor 12 (causing the speed of the motor 12 to become less negative). Eventually, the speed of the motor 12 passes through zero, at which moment there is a phase reversal in the motor current trace 61. Thereafter, the motor drive 10 continues to increase the speed of the motor in the positive direction. Although the total amount of time required to bring the motor 12 to the commanded speed is several seconds, the reconnection process itself takes less than 400 ms. This compares to the at least several seconds required for reconnection if frequency sweeping were utilized.

The present invention therefore exhibits numerous advantages over prior art approaches for reconnecting a motor drive to a motor. First, the present invention does not require any additional hardware. The present invention obtains an indication of the speed of the motor by examining the outputs of the motor drive. These outputs are generated by the motor drive, and therefore their values may be determined, for example, by determining the value of a variable in software or firmware. There is no need to provide a circuit for performing a separate voltage measurement or a mechanical sensor to directly measure the speed of the motor.

Second, the present invention can be used in conjunction with induction motors, as well as in conjunction with other types of motors. As previously noted, induction motors present the special problem that they do not produce a back EMF automatically when mechanically driven. The present invention utilizes positive feedback to induce a magnetic field in the motor which increases as the motor continues to be excited, or which at least does not decay so rapidly that the speed of the motor cannot be accurately determined (in the event that the motor is only slowly rotating). While the positive feedback makes the present invention especially advantageous for use in conjunction with small induction motors, the invention can also be used in conjunction with other types of motors.

Finally, the present invention is able to reconnect the motor drive in a very short amount of time. As described above, the present invention is able to reconnect a motor drive to a motor in a fraction of the amount of time required by some prior art approaches. The ability to reconnect the motor drive in a very short amount of time makes it possible to recover from a temporary power outage so quickly that the power outage becomes imperceptible.

Many changes and modifications may be made to the present invention without departing from the spirit thereof. For example, voltage regulators could be used instead of current regulators in the motor drive to control the voltage and current through the motor. The scope of these and other changes will become apparent from the appended claims.

I claim:

1. A method of reconnecting an induction motor to a motor drive, the method comprising:
   (A) exciting the induction motor to induce a back EMF in the induction motor, the exciting step including
      (1) controlling current which flows through the induction motor using first and second regulators, an output of the first regulator being separated in phase from an output of the second current regulator by approximately 90°, and
      (2) establishing a positive feedback loop, including using the output of one of the first and second regulators to generate an input for the other of the first and second regulators;
   (B) determining a speed of rotation of the induction motor based on the back EMF induced during step (A); and
   (C) reconnecting the motor drive to the induction motor based on the speed determined during step (B).

2. A method to claim 1,
   wherein the first regulator is a first current regulator and a regulates a torque-producing current;
   wherein the second regulator is a second current regulator and a regulates a field-producing current; and
   wherein the input of the second current regulator is generated based upon the output of the first current regulator.

3. A method according to claim 1,
   wherein the outputs of the first and second regulators are voltage command outputs, and
   wherein, during step (B), the back EMF is measured by examining the voltage command output of at least one of the first and second regulators.

4. A method of reconnecting an electric motor to a motor drive, the method comprising:
   (A) determining a speed of rotation of the motor, including
      (1) controlling a current which flows through the motor using a current regulator, the current regulator producing a voltage command output based on a current command input,
      (2) commanding a current at the current command input of the current regulator, and
      (3) examining the voltage command output produced by the current regulator in response to the current command input, the voltage command output being examined to determine the speed of the motor; and
   (B) reconnecting the motor drive to the motor based on the speed determined during step (A).

5. A method according to claim 4,
   wherein the motor is an induction motor,
   wherein the current regulator is a first current regulator and the voltage command output is a first voltage command output,
   wherein current which flows through the motor is also controlled using a second current regulator, the second current regulator producing a second voltage command output based on a second current command input, the second voltage command output being separated in phase from the first voltage command output by approximately 90°, and
   wherein the determining step further comprises exciting the motor to induce a back EMF, the exciting step including establishing a positive feedback loop, including using the voltage command output for one of the first and second current regulators to generate the current command input for the other one of the first and second current regulators.

6. A method according to claim 5, further comprising determining a direction of rotation of the motor, including
   (1) commanding a current at the current command inputs of the first and second current regulators, and
   (2) examining the voltage command outputs of the first and second current regulators in response to the current command inputs, the voltage command outputs being examined to determine the direction of rotation of the motor.

7. A method according to claim 6, wherein the step of examining the voltage command outputs to determine the direction of rotation further comprises multiplying a signal which is representative of one of the voltage command outputs with a signal which is representative of the other one of the voltage command outputs, the product of the multiplication having a sign which indicates the direction of rotation.

8. A method according to claim 4 wherein, during step (A)(2), a current of zero amperes is commanded.

9. A system comprising:
   an induction motor; and
   a motor drive, the motor drive being coupled to the induction motor, the motor drive including a control system which controls current through the motor, the control system including
      a first current regulator which controls a first component of the current through the motor and the first current regulator having a voltage command output,
      a second current regulator which controls a second component of the current through the motor, the second current regulator having a current command input, and the first and second components being separated in phase by approximately 90°, and
      a positive feedback loop which connects the voltage command output of the first current regulator to the current command input of the second current regulator, the positive feedback loop exciting the motor to induce a back EMF when the motor drive is being reconnected to the motor.

10. A system according to claim 9, wherein the induction motor is no more than a ten horsepower motor.

11. A system according to claim 10, wherein the induction motor is a three-phase induction motor.

12. A system according to claim 9, wherein the motor drive further comprises an AC-DC power converter and a PWM voltage inverter, the PWM voltage inverter controlling the supply of power from the AC-DC power converter to the induction motor based on control signals received from the first and second current regulators.

13. A method of reconnecting an induction motor to a motor drive, the method comprising:
   (A) controlling current which flows through the motor using first and second current regulators, the first current regulator controlling a first component of the current through the motor, and the first current regulator generating a first voltage command output based on a first current command input, and the second current regulator controlling a second component of the current through the motor, the second current regulator generating a second voltage command output based on a second current command input, the first and second components being separated in phase by approximately 90°;

(B) determining a direction of rotation of the induction motor, including
  (1) commanding a current at the first and second current command inputs of the first and second current regulators, respectively, and
  (2) examining at least one of the first and second voltage command outputs to determine the direction of rotation of the induction motor;

(C) determining a speed of rotation of the induction motor, including
  (1) establishing positive feedback for the second current regulator, including using the first voltage command output to generate the second current input, such that the second current command input is approximately 90° out of phase with the second voltage command output and has a frequency which approximately corresponds to the speed of the induction motor,
  (2) exciting the induction motor with a current controlled by the second current regulator, and
  (3) examining at least one of the first and second voltage command outputs to determine the speed of rotation of the induction motor; and (D) reconnecting the induction motor based on the speed determined during step (C).

14. A method according to claim 13, further comprising
(A) determining, before the direction of rotation is determined, that the induction motor is not producing back EMF, the determining step including
  (1) commanding a current at the first and second current command inputs, and
  (2) examining at least one of the voltage command outputs of the first and second current regulators to determine that the induction motor is not producing back EMF;
(B) pre-exciting the induction motor to induce a back EMF in response to determining that the induction motor is not producing back EMF.

15. A method according to 14, wherein pre-exciting the induction motor comprises applying first and second current pulses, one of the first and second current pulses being a positive current pulse and the other one of the first and second current pulses being a negative current pulse.

16. A method according to claim 13, wherein determining the direction of rotation of the induction motor comprises multiplying a signal which represents a voltage command output of one of the first and second current regulators with a signal that represents a derivative of a voltage command output of the other one of the first and second current regulators.

17. A method of reconnecting an induction motor to a motor drive, the method comprising:
(A) exciting the induction motor to induce a back EMF in the induction motor, the exciting step including
  (1) controlling current which flows through the induction motor using first and second regulators, an output of the first regulator being separated in phase from an output of the second current regulator by approximately 90°, and
  (2) establishing a positive feedback loop, including using the output of one of the first and second regulators to generate an input for the other of the first and second regulators;
(B) determining a frequency of the back EMF in the induction motor; and
(C) reconnecting the motor drive to the induction motor based on the frequency determined during step (B).

18. A method according to claim 17,
wherein the first regulator is a first current regulator and regulates a torque-producing current;
wherein the second regulator is a second current regulator and regulates a field-producing current; and
wherein the input of the second current regulator is generated based upon the output of the first current regulator.

19. A method according to claim 17,
wherein the outputs of the first and second regulators are voltage command outputs, and
wherein, during step (B), the frequency of the back EMF is determined by examining the voltage command output of at least one of the first and second regulators.

20. A method of reconnecting an electric motor to a motor drive, the method comprising:
(A) determining a frequency of a back EMF in the motor, including
  (1) controlling a current which flows through the motor using a current regulator, the current regulator producing a voltage command output based on a current command input,
  (2) commanding a current at the current command input of the current regulator, and
  (3) examining the voltage command output produced by the current regulator in response to the current command input, the voltage command output being examined to determine the frequency of the back EMF; and
(B) reconnecting the motor drive to the motor based on the frequency determined during step (A).

21. A method according to claim 20,
wherein the motor is an induction motor,
wherein the current regulator is a first current regulator and the voltage command output is a first voltage command output,
wherein current which flows through the motor is also controlled using a second current regulator, the second current regulator producing a second voltage command output based on a second current command input, the second voltage command output being separated in phase from the first voltage command output by approximately 90°, and
wherein the determining step further comprises exciting the motor to induce the back EMF, the exciting step including establishing a positive feedback loop, including using the voltage command output for one of the first and second current regulators to generate the current command input for the other one of the first and second current regulators.

22. A method according to claim 21, further comprising determining a direction of rotation of the motor, including
  (1) commanding a current at the current command inputs of the first and second current regulators, and
  (2) examining the voltage command outputs of the first and second current regulators in response to the current command inputs, the voltage command outputs being examined to determine the direction of rotation of the motor.

23. A method according to claim 22, wherein the step of examining the voltage command outputs to determine the direction of rotation further comprises multiplying a signal which is representative of one of the voltage command outputs with a signal which is representative of the other one of the voltage command outputs, the product of the multiplication having a sign which indicates the direction of rotation.

24. A method according to claim 20 wherein, during step (A)(2), a current of zero amperes is commanded.

* * * * *